(12) United States Patent
Fukushima et al.

(10) Patent No.: US 6,490,246 B2
(45) Date of Patent: *Dec. 3, 2002

(54) SYSTEM AND METHOD FOR USING ACTIVE AND STANDBY ROUTERS WHEREIN BOTH ROUTERS HAVE THE SAME ID EVEN BEFORE A FAILURE OCCURS

(75) Inventors: Hidehiro Fukushima, Fujisawa (JP); Masato Tsukakoshi, Sagamihara (JP); Shigeki Morimoto, Atsugi (JP); Tohru Setoyama, Fujisawa (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/478,376

(22) Filed: Jan. 6, 2000

(65) Prior Publication Data

US 2002/0060986 A1 May 23, 2002

Related U.S. Application Data

(63) Continuation of application No. 09/195,707, filed on Nov. 19, 1998, now Pat. No. 6,049,524.

(30) Foreign Application Priority Data

Nov. 20, 1997 (JP) .............................................. 9-320083

(51) Int. Cl.$^7$ ............................. H04J 1/16; G01R 31/08
(52) U.S. Cl. ...................................... 370/220; 370/351
(58) Field of Search ................................. 370/351, 381, 370/389, 390, 400, 216, 217, 218, 219, 220, 237, 395.32; 709/239, 242

(56) References Cited

U.S. PATENT DOCUMENTS

| | | | |
|---|---|---|---|
| 5,138,615 A | | 8/1992 | Lamport et al. ............. 370/400 |
| 5,473,599 A | * | 12/1995 | Li et al. ...................... 370/219 |
| 5,835,696 A | | 11/1998 | Hess ....................... 395/182.02 |
| 5,848,227 A | | 12/1998 | Sheu ....................... 395/182.02 |
| 5,913,921 A | * | 6/1999 | Tosey et al. ................. 709/220 |
| 6,049,524 A | * | 4/2000 | Fukushima et al. .......... 370/220 |
| 6,154,463 A | * | 11/2000 | Aggarwal et al. ........... 370/408 |

OTHER PUBLICATIONS

Stevens, Richard TCP/IP Illustrated, vol. 1, 1994, Addison–Wesley, pp. 127–129, 137–138, 141.*

(List continued on next page.)

Primary Examiner—David Vincent
(74) Attorney, Agent, or Firm—Antonelli, Terry, Stout & Kraus, LLP

(57) ABSTRACT

A multiplex router device, having a multiplex configuration, is instrumental in reducing internal and external traffic flows for a routing protocol process that occurs at a time of system switchover. A data base integration module, in a route calculation unit in the active mode, stores network link-state information collected by a routing protocol packet transmission-reception module in a link-state data base, and at the same time sends the information to a route calculation unit, but does not send routing protocol information collected. In the route calculation unit in the standby mode, a data base integration module that received the network link-state information stores its contents into its own link-state data base. When a failure occurs in the route calculation unit in the active mode, the route calculation unit performs the routing protocol process by using the stored link-state data base.

7 Claims, 11 Drawing Sheets

OTHER PUBLICATIONS

Comer, Douglas, Internetworking With TCP/IP vol. I, 1995, pp. 266, 313–316.*

"Configuration Fundamentals, Configuration Guide", Cisco Internetwork Operation System Release 11.2, Cisco Systems, Inc., 1996.

Configuration Fundamentals Configuration Guide, Cisco IOS Release 11.2, Cisco Systems.

New Cisco 7500 Delivers More Routing Muscle, Packet Magazine Archives, Third Quarter 1995, Cisco Systems, Inc.

Configuring High System Availability Operation, Route Switch Processor (RSP2) Installation and Configuration Cisco Connection Documentation, Enterprise Series, vol. 3, No. 5, 1996.

* cited by examiner

| ROUTER ID | NETWORK | INTERFACE ADDRESS | COST |
|---|---|---|---|
| 192.168.1.1 | netA | 192.168.1.1 | 1 |
| | netB | 192.168.10.3 | 3 |
| | netC | 192.168.12.10 | 3 |
| 192.168.10.5 | netB | 192.168.10.5 | 1 |
| | netD | 192.168.11.12 | 2 |
| 192.168.12.3 | netC | 192.168.12.3 | 5 |
| | netE | 192.168.15.1 | 2 |
| 192.168.1.5 | netA | 192.168.1.5 | 1 |
| | netD | 192.168.11.1 | 1 |
| | netE | 192.168.15.2 | 1 |

| NETWORK | NEXT HOP ROUTER ADDRESS | COST |
|---|---|---|
| netA | — | 1 |
| netB | 192.168.11.12 | 2 |
| netC | 192.168.1.1 | 4 |
| netD | — | 1 |
| netE | — | 1 |

SYSTEM AND METHOD FOR USING ACTIVE AND STANDBY ROUTERS WHEREIN BOTH ROUTERS HAVE THE SAME ID EVEN BEFORE A FAILURE OCCURS

This is a continuation of application Ser. No. 09/195,707, filed Nov. 19, 1998 now U.S. Pat. No. 6,049,524.

BACKGROUND OF THE INVENTION

1. Field of the Invention

The present invention relates to a router device for routing packets to destinations on networks, and more particularly to system switchover technology in a router device having a redundant configuration.

2. Description of Related Art

A router, which forwards packets between the terminals of different networks, needs to exchange routing information with another router to perform dynamic routing of packets, and on the basis of routing information, create a routing table which shows the destination addresses of packets associated with transit nodes.

Two protocols are known for exchanging routing information and for generating a routing table based on the information: one is a Distance Vector Algorithm (DVA) based protocol, such as Routing Information Protocol (RIP) stipulated by Request for Comments (RFC) 1058 prepared by Internet Engineering Task Force (IETF) and issued from the Internet Architecture Board (IAB), and the other is Link-State Algorithm (LSA) based protocol such as Open Shortest Path First (OSPF) stipulated by RFC 1247.

A RIP-based router exchanges routing table entries with another router and determines a routing path according to the number of hops (the number of routers to the destination), while an OSPF-based router exchanges network connection state information (addresses and so on) and determines a path based on a cost determined by considering many factors including the number of hops. It should be noted that, in exchanging routing information among routers, a particular packet called a routing protocol packet is used.

More specifically, in OSPF, each router exchanges information with all other routers by using packets called routing protocol packets. Each router periodically transmits packets called Hello packets, a kind of routing protocol packet, to the network. A Hello packet includes the router's own ID, and the identity of the network to which the router is connected, and a list of other routers' ID's connected to the same network to which the router is connected. The other routers' ID's placed in the above list include the other routers' ID's of which the router was made aware by Hello packets received from other routers.

If a router receives a Hello packet, which includes its own ID, from another router that the router has been aware of, on the understanding that the two routers have become aware of each other, the two routers exchange network link-state information by sending routing protocol packets.

Network link-state information includes the ID of the advertising router, the identity of the network to which the advertising router is connected, the addresses of the interfaces through which the advertising router is connected to the networks, and the costs of the interfaces. The cost of an interface means the cost which is incurred when the interface is used to forward packets and which is set by the network administrator.

A router which collected network link-state information from another network connected to the same network creates a routing table specifying the least-cost path as the packet route. This router forwards the packet according to a resulting routing table.

Network link-state information is transmitted by a router where a change occurred in its configuration. A router receiving this information updates the routing table if an update is necessary according to contents of the change.

Meanwhile, each router, while it transmits or receives Hello packets and network link-state information, manages the states of other routers on the network to which this router is connected and also manages the states of the interfaces through which this router is connected to networks. With regard to the states of routers, each router manages the routers' ID's, and checks if each of those routers is aware of this router, or checks if each of those routers has completed the transmission and reception of network link-state information. With regard to interface state, each router manages the addresses of the interfaces and other routers connected to a network to which an interface is connected.

A list of other routers, which is included in a Hello packet, is prepared according to the states of routers and the states of interfaces mentioned above.

Each router monitors the active modes of the other routers according to information from Hello packets it receives. More specifically, if there is any other router from which the router has not received Hello packets for longer than a fixed period, the router decides that a failure has occurred in this other router. Also, the router takes measures such as altering the contents of the routing table to establish another path to avoid the faulty router.

To improve the performance of the routers, it has recently been proposed to separate a router into a portion for forwarding packets and a portion for creating a routing table. Using this configuration, it becomes possible to execute the packet forwarding process regardless of the load on the process of creating the routing table.

This technique is described in "Packet Magazine Third Quarter 1995" (Cisco).

In this specification, the portion for creating a routing table is called a route calculation unit and the portion for counting packets is called a forwarding process unit.

To enhance the reliability of the router device, it is now common practice to multiplex the above-mentioned route calculation units. The multiplex router device includes a plurality of route calculation units, and always has one route calculation unit placed in the active mode to make it execute an ordinary process while keeping the remaining route calculation units in a standby mode. When the route calculation unit in the active mode runs into trouble, the multiplex router device brings one of the waiting route calculation units into the active mode (this is referred to as a system switchover of route calculation units), and the one other route calculation unit takes over and continues to execute the process that was previously being executed by the route calculation unit in trouble.

This technique is described in Cisco's manual, "Configuration Fundamentals Configuration Guide". Cisco System, Inc. 1996

To prevent the other routers from being affected by this system switchover of the route calculation units or to facilitate the system switchover, a thinkable method includes the steps of sending all items of information (network link-state information, states of routers, and states of interfaces), which the route calculation unit in the active mode obtained from the routing protocol process, from the route calculation unit in the active mode to the route calculation units in the standby mode, and storing them in the route calculation units in the standby mode. With the above arrangement, the same states in the route calculation unit, which was previously in the active mode, can be reproduced in a route calculation unit which is subsequently brought into the active mode, and the route calculation unit newly brought into the active mode can promptly become capable of executing the same process as did the previously operating route calculation unit. Consequently, the other routers are protected from the affects of the system switchover of the routers.

However, according to the above-mentioned system switchover technology, the amount of information that must be sent from the route calculation unit that has been in the active mode to the route calculation unit in the standby mode increases as the number of other routers increases. For this reason, as the channels accommodated in the respective routers increase and the routers increase in number as the size of the network becomes larger, the traffic volume in the routers becomes too large due to the transmission of information from the operating route calculation units to the route calculation units in the standby mode. If such excessively large traffic flows occur, delays will arise in the process by the route calculation units themselves or enough traffic capacity cannot be secured for forwarding of packets due to the traffic of information from the route calculation units in the active mode to the route calculation units in the standby mode. The above-mentioned heavy traffic is likely to provide hindrances to the packet forwarding. From a different point of view, it is impossible to accommodate a large number of channels in the router device.

On the other hand, if any information obtained by the routing protocol process is not transmitted from the route calculation unit in operation to the route calculation unit in standby mode, not only must the route calculation unit, which is subsequently brought into operation, execute the routing protocol process from the beginning, but also the other routers must execute the routing protocol process. Furthermore, the packets that have passed this router cannot be forwarded in a normal manner until the routing protocol process ends and the router collects network link-state information about the other routers and reorganizes the routing table. Furthermore, the traffic on the network is increased, for example, by exchange of network link-state information by routing protocol packets.

SUMMARY OF THE INVENTION

The present invention has as its object to prevent the occurrence of interruption of packet forwarding or an increase in traffic on the network while reducing the amount of information to be transmitted from the route calculation unit in operation to a route calculation unit in a standby mode at least in a multiplex router device, which includes a plurality of route calculation units.

To achieve the above object, according to the present invention, there is provided a multiplex router device comprising a plurality of route calculation units, each performing a routing protocol process to create a routing table used to determine a packet route, wherein when one of the route calculation units is set in an active mode and at least one of other route calculation units is set in a standby mode, if a failure occurs in the route calculation unit in the active mode, the one route calculation unit in the standby mode is brought into the active mode.

The route calculation unit includes a memory, process unit, notification unit and holding unit.

The memory holds routing protocol information, when the route calculation unit concerned is in the active mode. The routing protocol information includes network link-state information showing connections between the routers and networks, the states of neighboring routers showing the link-states with neighboring routers, and interface states showing states of network interfaces to connect the multiplex router device to networks.

The process unit executes the routing protocol process, including collection of the routing protocol information held in the memory means, according to the routing protocol information held in the memory.

The notification unit sends, when the route calculation unit concerned is in the active mode, to the route calculation unit in the standby mode only the network link-state information out of the network link-state information, neighboring router states, and interface states stored in the memory. and The holding unit holds in the memory the network link-state information sent from the route calculation unit in the active mode when the route calculation unit is in the standby mode.

According to the multiplex router device described above, because the information sent from the route calculation unit in the active mode to the route calculation unit in the standby mode is network link-state information only, the internal traffic is less than that in the case where all items of routing protocol information are sent. The route calculation unit shifted from the standby mode to the active mode already obtained network link-state information while it was in the standby mode and holds this information, so that it is not necessary for this route calculation unit to exchange information with other routers to collect the network link-state information over again. Consequently, the volume of traffic on the networks can be reduced compared to the case where no routing protocol information is sent to the route calculation unit in the standby mode. The network link-state information held while the router is in the standby mode matches the contents of the routing table the moment the router is shifted to the active mode. Therefore, on every system switchover of the route calculation units to be set in the active mode, the contents of the routing table cease to exist, and the normal packet forwarding is prevented from being affected by system switchover.

BRIEF DESCRIPTION OF THE DRAWINGS

FIG. 4 is a diagram showing the contents of a link-state data base;

FIG. 5 is a diagram showing an example of the contents of a routing table;

DETAILED DESCRIPTION OF THE PREFERRED EMBODIMENTS

Description will now be given of a first embodiment of the present invention. Referring to a case where OSPF is used as the routing protocol, the router device according to the first embodiment will be explained.

Figure 1:
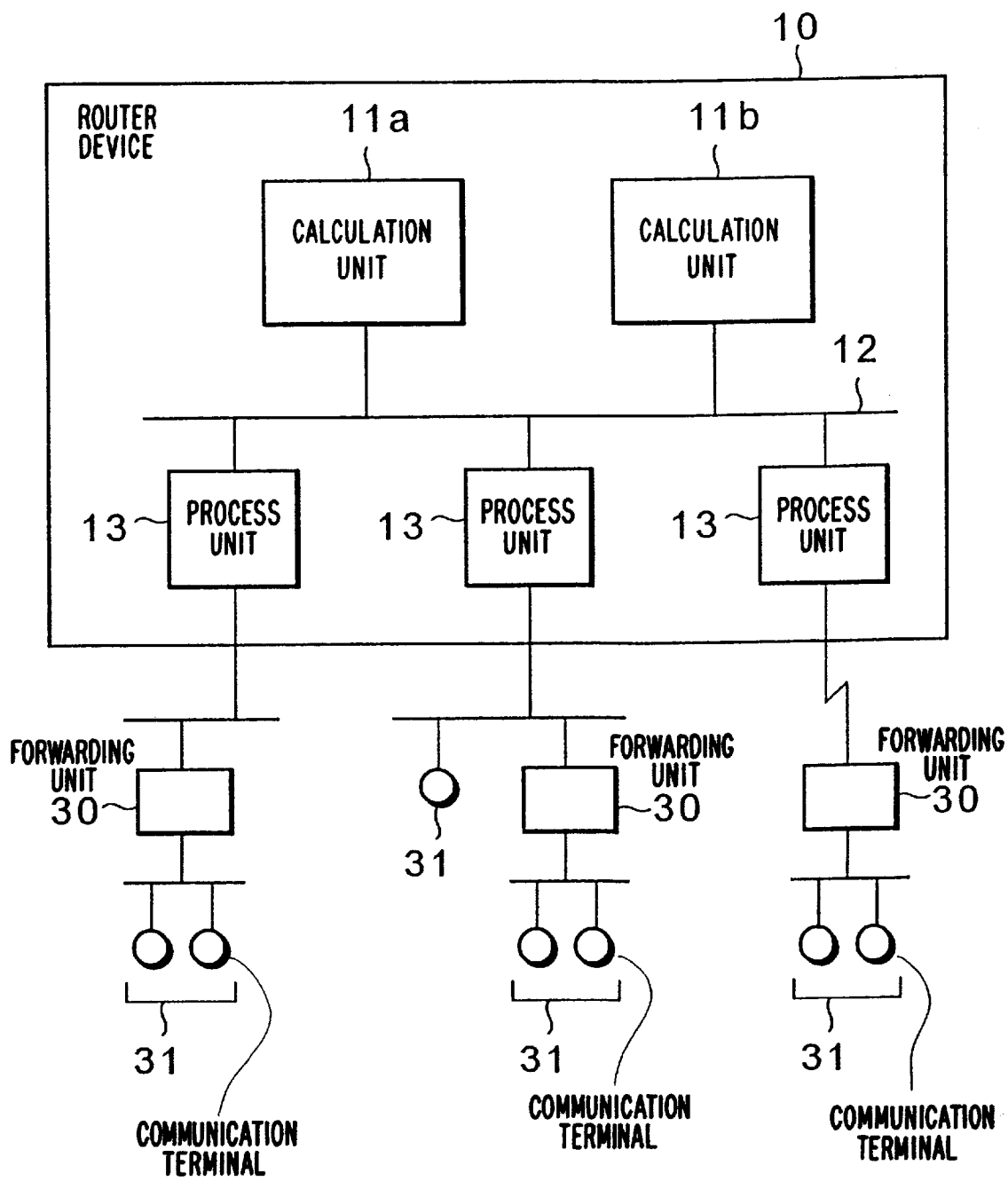
FIG. 1 is a block diagram showing a configuration of a network system to which a multiplex router according to a first embodiment of the present invention is applied.

FIG. 1 shows the configuration of the network system to which the router device according to the first embodiment is applied.

In FIG. 1, reference numeral 10 denotes a router device according to the first embodiment, which includes two route calculation units 11a, 11b, provided in a multiplex configuration, and a plurality of forwarding process units 13.

The router with two route calculation units 11a, 11b in a multiplex configuration is hereunder referred to as the "multiplex router device" for convenience in differentiating it from other routers.

The multiplex router device 10 is connected through the forwarding units 13 to networks. Other routers 30 and communication terminals 31 are connected to the networks. A network is formed of lines that terminate at one end with the multiplex router 10 and terminate at the other end with a router 30.

Figure 2:
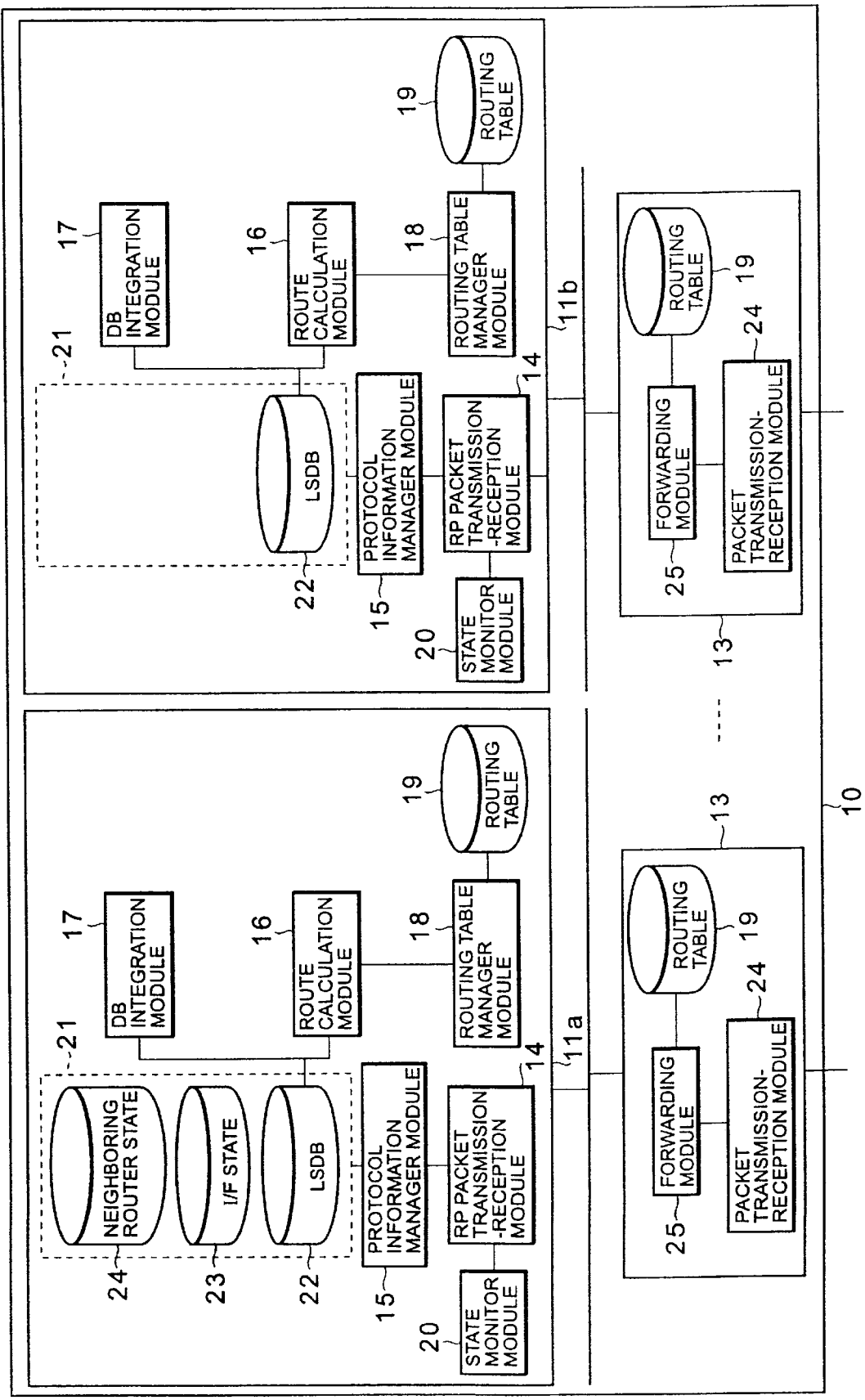
FIG. 2 is a diagram showing a multiplex router according to the first embodiment of the present invention.

FIG. 2 shows a detailed configuration of the multiplex router device 10.

As shown in FIG. 2, the multiplex router 10 is formed in a configuration, including two route calculation units 11a, 11b, provided in a multiplex configuration, which create and distribute a routing table for use in packet forwarding, and the forwarding process units 13 for packet forwarding, and those units are interconnected by an internal bus 12 in the router.

Each forwarding process unit 13 includes a routing table 19, a forwarding module 25, and a packet transmission-reception module 24. Each route calculation unit 11a or 11b includes a routing protocol (RP) packet transmission-reception module 14, a protocol information manager module 15, a route calculation module 16, a data base (DB) integration module 17, a routing table manager module 18, a routing table 19, a state monitor module 20, and a routing protocol information module 21. The routing protocol information module 21 stores routing protocol information, such as a link-state data base (LSDB) 22, interface (I/F) state 23, and neighboring router state 24.

Out of the two route calculation units 11, one is placed in the active mode and the other is placed in the standby mode.

Description will be given of the contents of the link-state data base 22 and the routing table 19 in the route calculation units 11a, 11b. Note that the routing table 19 in the forwarding process unit 13 is the same as the routing table 19 in the route calculation unit 11 as will be described later.

Figure 3:
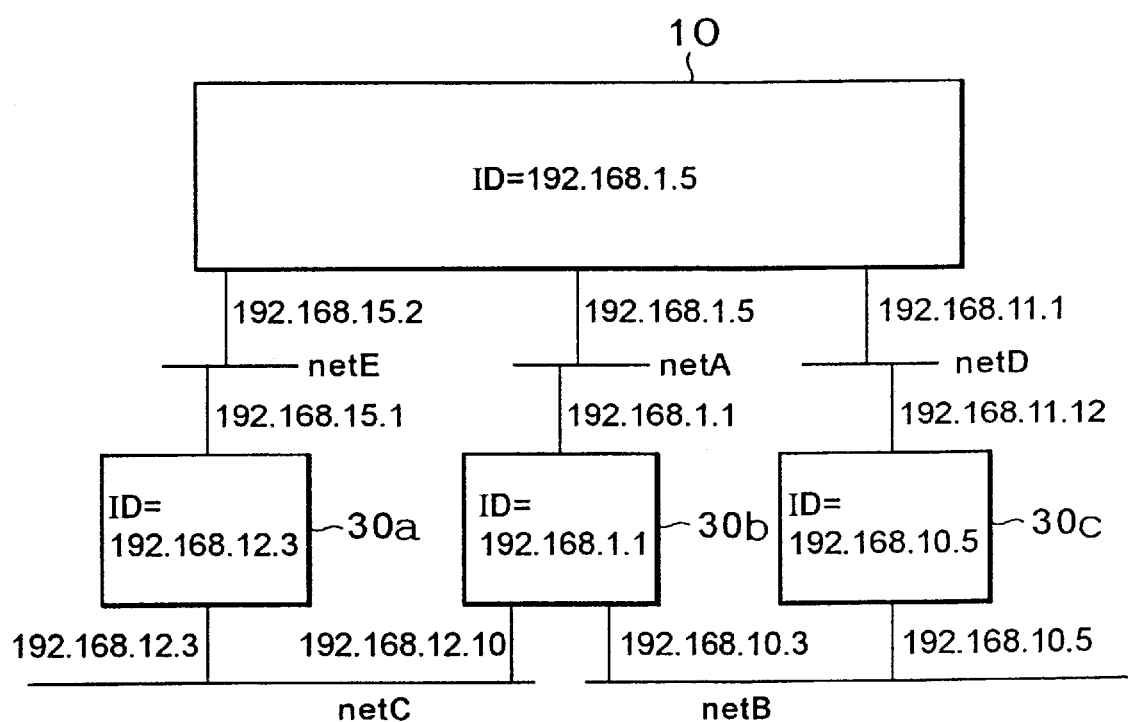
FIG. 3 is a diagram showing an interconnection example of a network system including a multiplex router according to the first embodiment of the present invention.

Taken as an example here is a case where networks are formed by a multiplex router 10 and three routers 30a, 30b and 30c as shown in FIG. 3.

Assume that the three interfaces of the multiplex router 10 are connected to netE, netA and netD, the two interfaces of a router 30a are connected to netE and netC, the three interfaces of a router 30b are connected to netA, netC and netB, and the two interfaces of a router 30c are connected to netD and netB.

Assume that the interfaces from the multiplex router 10 and the routers 30a, 30b, and 30c to the networks are given the addresses as shown in FIG. 3.

Assume that the routers are given ID's (identities) as shown in FIG. 3 and those ID's are called the router ID's.

In this case, data is registered in the link-state data base 22 of the multiplex router 10 as shown in FIG. 4.

As shown in FIG. 4, this data base shows information about the multiplex router 10 and the other routers 30 connected to the networks to which the multiplex router 10 is connected, more specifically, information about router ID's, the identity of the networks to which the routers with those router ID's are connected, the interfaces and the costs assigned to the interfaces. The costs are assigned to the interfaces by configuration definition and the like, and the values are decided by taking into account the bandwidths of the networks connected and the user policies.

The link-state data base 22 makes it possible to understand the configuration of the network system from its contents. For example, in FIG. 3, from the entries of router ID=192.168.1.1, it is possible to know that the router with ID of 192.168.1.1 is connected to netA, netB and netC, and the connection interfaces have the addresses of 192.168.1.1, 192.168.10.3, and 192.168.12.10, respectively. These items of data precisely represent the interconnections of the router 30b as shown in FIG. 3.

FIG. 5 shows the contents of the routing table 19.

The routing table 19 is created from the link-state data base 22 according to the predetermined procedure. This procedure is called the SPF (Shortest Path First) algorithm, which decides the shortest path from this router to a destination network by considering cost, and the shortest path is registered in the routing table 19.

The routing table 19 created by the SPF algorithm in the multiplex router shows the identity of the networks, the interface addresses of the router through which a packet is to be routed in order to reach the networks (namely, next hop router addresses), and total costs up to the networks.

In the case of FIG. 3, the multiplex router 10 is directly connected to netA, netD and netE (without the intervention of another router). Therefore, there are no next hop router addresses for netA, netD or netE.

On the other hand, to send a packet from the multiplex router 10 to netB, there are two paths, one path passing through netA and the router 30b, and the other path passing through netD and the router 3c (Refer to FIG. 3). The cost of the former path is the sum of the cost of the multiplex router's interface to netA (value 1) and the cost of the router 30b's interface to netB (value 3), namely, 4. On the other hand, the cost of the latter path is the sum of the cost of the multiplex router's interface to netD (value 1) and the cost of the router 30c's interface to netB (value 1), namely, 2. The latter path incurs a lower cost, and therefore the latter path is selected. Therefore, the next hop router address for netBis 192.168.11.12, which is the address of the router 30c's interface to netD, and the cost is 2.

To send a packet from the multiplex router 10 to netC, there are two paths, one path passing through netE and the router 30a and the other path passing through netA and the router 30b (Refer to FIG. 3). The cost of the former path is the sum of the cost of the multiplex router 10's interface to netE (value 1) and the cost of the router 30a's interface to netC (value 5), namely, 6. On the other hand, the cost of the latter path is the sum of the multiplex router 10's interface to netA (value 1) and the cost of the router 30b's interface to netC, namely, 4. The cost is lower for the latter path, and so the latter path is selected. Therefore, the next hop router address for netC is 192.168.1.1 which is the address of the router 30b's interface to netA, and the cost is 4.

Each of the routers 30 other than the multiplex router 10 has its own link-state data base and routing table.

The operation of the multiplex router according to the first embodiment will be described in the following.

In FIG. 1, when the route calculation unit 11a in the multiplex router 10 is in the active mode and the route calculation unit 11b is in the standby mode, the routers 30 exchange routing protocol packets with the route calculation unit 11a through the forwarding process units 13. Network link-state information that the route calculation unit 11a received from the routers 30 is first held in the route calculation unit 11a and further sent through the internal bus 12 to the route calculation unit 11b.

The route calculation units 11a and 11b fetch data from their own link-state data bases 22, perform route calculations as mentioned above, and hold routing tables with the same contents. The route calculation unit 11a in the active mode sends a routing table to the forwarding process units 13 to have the packet forwarded according to the routing table.

If the route calculation unit 11a becomes unable to operate due to a failure or the like, the route calculation unit 11b in the standby mode detects the failure, and on behalf of the route calculation unit 11a, goes into the active mode. After this, the route calculation unit 11b exchanges routing protocol packets with the routers 30 through the intermediary of the forwarding process units 13.

After entering the active mode, the route calculation unit 11b sends and receives Hello packets, and generates information, such as neighboring router state 24 and interface state 23 in the routing protocol information module 21. However, the route calculation unit 11b, already holding network link-state information from the routers 30 as the link-state data base 22, does not exchange network link-state information with the routers 30 over again.

After being brought into the active mode, the route calculation unit 11b transmits Hello packets periodically. For a while immediately after the switchover to the active mode, the route calculation unit 11b has no information about the neighboring router state 24 and interface state 23. Therefore, Hello packets transmitted at this point in time from the route calculation unit 11b include information, such as the ID of the multiplex router 10 and the identity of the networks connected to the route calculation unit 11b itself. However, the packets do not include a list of ID's of other routers 30 connected to the same network to which the multiplex router 10 is connected because this list must be prepared from the above-mentioned information about neighboring router state 24 and interface state 23, which is not available at this moment in time. The route calculation unit 11b gradually accumulates information about the neighboring router state 24 and interface state 23 from Hello packets transmitted periodically from other routers 30, and also gradually brings into a complete form a list of ID's of other routers 30, which is included into Hello packets that the route calculation unit 11b sends out.

Because the other routers 30 that received Hello packets from the route calculation unit 11b are periodically receiving Hello packets from the multiplex router 10, the other routers 30 do not regard the multiplex router 10 as having run into a failure nor do they rewrite the routing tables they hold, even if the ID list of other routers included in received packets is incomplete. Therefore, even if a system switchover occurs, this does not affect the packet forwarding. If other routers 30 receive an incomplete packet from the multiplex router 10, by regarding the multiplex router 10 as being in a faulty state, they manage the router state of the multiplex router 10, and perform a routing protocol process specified in OSPF to cope with that router state. As described earlier, when subsequently receiving a complete Hello packet from the multiplex router 10, the routers 30 return to the ordinary routing protocol process they executed before the system switchover occurred.

Meanwhile, when the route calculation unit 11b brought into the active mode later receives network information from the other routers 30, it performs the same process as the route calculation unit 11a did when the route calculation unit 11a in the active mode received network link-state information as described above.

Note that network link-state information that a given router transmits includes the contents equivalent to the information registered in the link-state table about this router as shown in FIG. 4.

Description will now be given of the operation of the interior of the multiplex router 10 that performs the operations mentioned above.

The state monitor module 20 in each of the route calculation units 11a and 11b in the multiplex router 10 holds state information about its own route calculation unit 11 and the other route calculation unit 11, and monitors the other route calculation unit 11. If the route calculation unit in the standby mode detects that the route calculation unit in the active mode is unable to execute the process due to a failure or the like, the state monitor module 20 brings its own route calculation unit into the active mode and starts the RP packet transmission-reception module 14.

In the route calculation unit 11 in the active mode, the RP packet transmission-reception module 14 exchanges routing protocol packets with other routers 30 connected to the multiplex router 10, and passes the contents of a packet and information about the interfaces that received the packet to the protocol information manager module 15. The protocol information manager module 15 generates routing protocol information 21, such as link-state data base 22, interface state 23, and neighboring router state 24 from information received from the RP packet transmission-reception module 14, and retains these items of information.

When the link-state data base 22 is updated by the operation of the protocol information manager module 15, the route calculation module 16 and the data base integration module 17 are started. The route calculation module 16 calculates a route from the link-state data base 22, and passes resulting route information to the routing table manager module 18.

On the other hand, the data base integration module 17 refers to state information about its own route calculation unit 11, and when it is in the active mode, sends update information from the link-state data base 22 to the other route calculation unit 11.

When the data base integration module 17 in the route calculation unit 11 in the standby mode receives the above-mentioned update information, the received information is reflected in the link-state data base 22 of its own unit. Thus, network link-state information independently collected by the route calculation unit 11 in the active mode is reflected in the link-state data base 22 of the other route calculation unit 11 in the standby mode. Interface state 23 and neighboring router state 24 are retained in the route calculation unit 11 in the active mode, but they are not retained in the route calculation unit in the standby mode.

In the route calculation unit in the standby mode, when the link-state data base 22 is updated by the data base integration module 17, the route calculation module 16 starts to operate, and calculates a route from the link-state data base 22 and passes resulting route information to the routing table manager module 18.

In the route calculation units in the active mode and in the standby mode, the routing table manager module 18, when receiving new route information, updates the routing table 19. The route calculation unit in the active mode also sends update information of the routing table to all forwarding process units 13 connected to the internal bus 12. The route calculation unit in the standby mode merely updates the routing table 19 in the module 18 but does not send the update information to any forwarding process unit 13.

Detailed description will be given of the process steps executed by the respective modules in each route calculation unit 11 to realize the above-mentioned operations.

Figure 6:
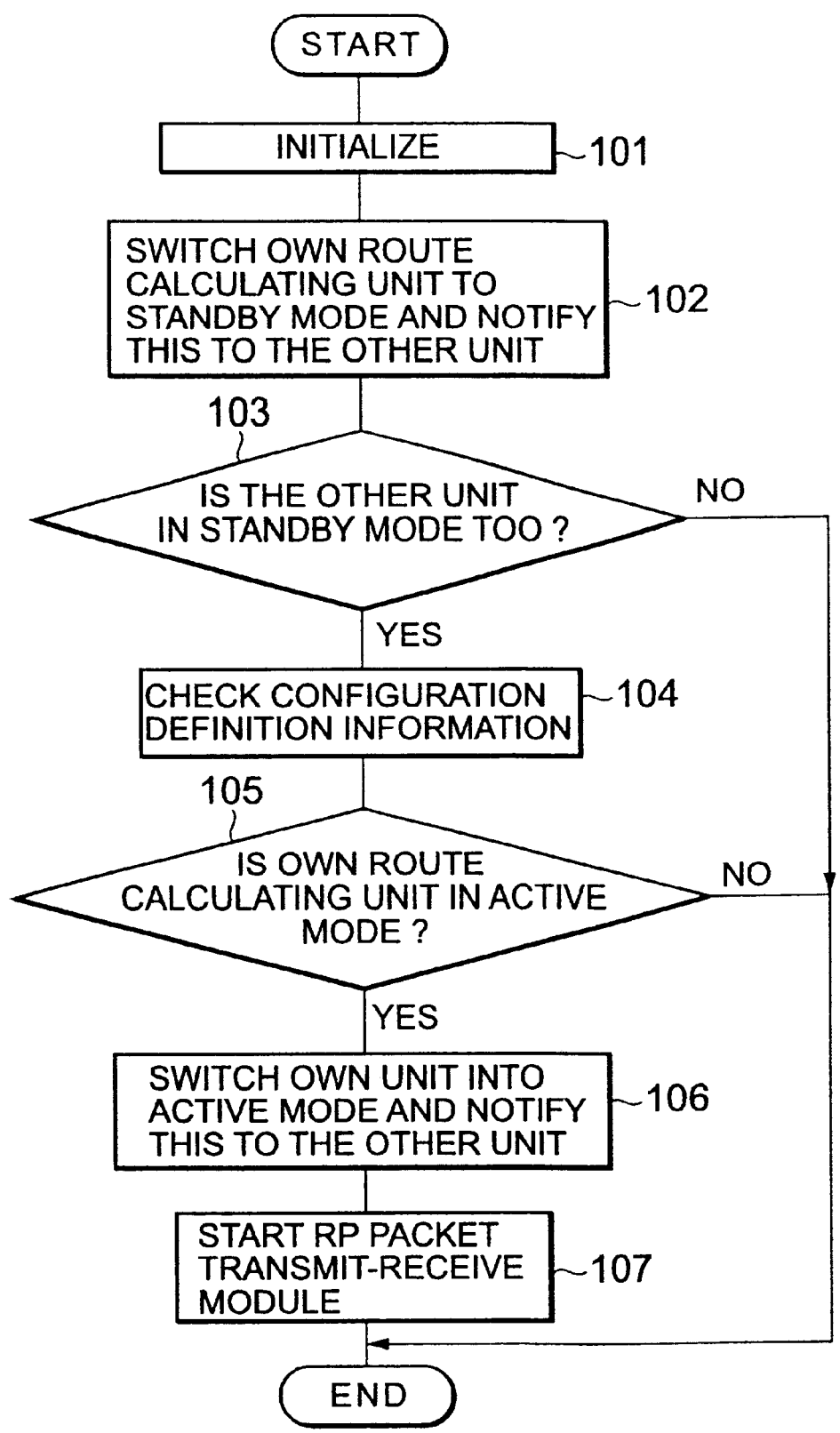
FIG. 6 is a flowchart showing the process executed by the state monitor module when the router is started in the first embodiment of the present invention.

FIG. 6 shows the flow of the process steps of the state monitor module 20 of each route calculation unit 11 when the multiplex router 10 starts its operation. When the multiplex router 10 goes into the active mode, the state monitor module 20 monitors the processing portions in its own route calculation unit 11 to make sure that they have been initialized (step 101). When the initialization step is finished, the route calculation units 11 have been initialized. At the end of the initialization, the route calculation units 11 are switched over to the standby mode, and each route calculation unit 11 gives notification that it has been placed in the standby mode to the other route calculation unit 11 (step 102).

The state monitor module 20 monitors the state of the other route calculation unit 11 (step 103). If all route calculation units are in the standby mode, the state monitor module 20 checks the contents set in the configuration definition information in the route calculation unit (step 104). If the route calculation unit of its own side is set in the active mode in the configuration definition information (step 105), the route calculation unit 11 brings itself into the active mode, and this is notified to the other route calculation unit 11 (step 106). Subsequently, the RP packet transmission-reception module 14 (step 107) is started.

Figure 7:
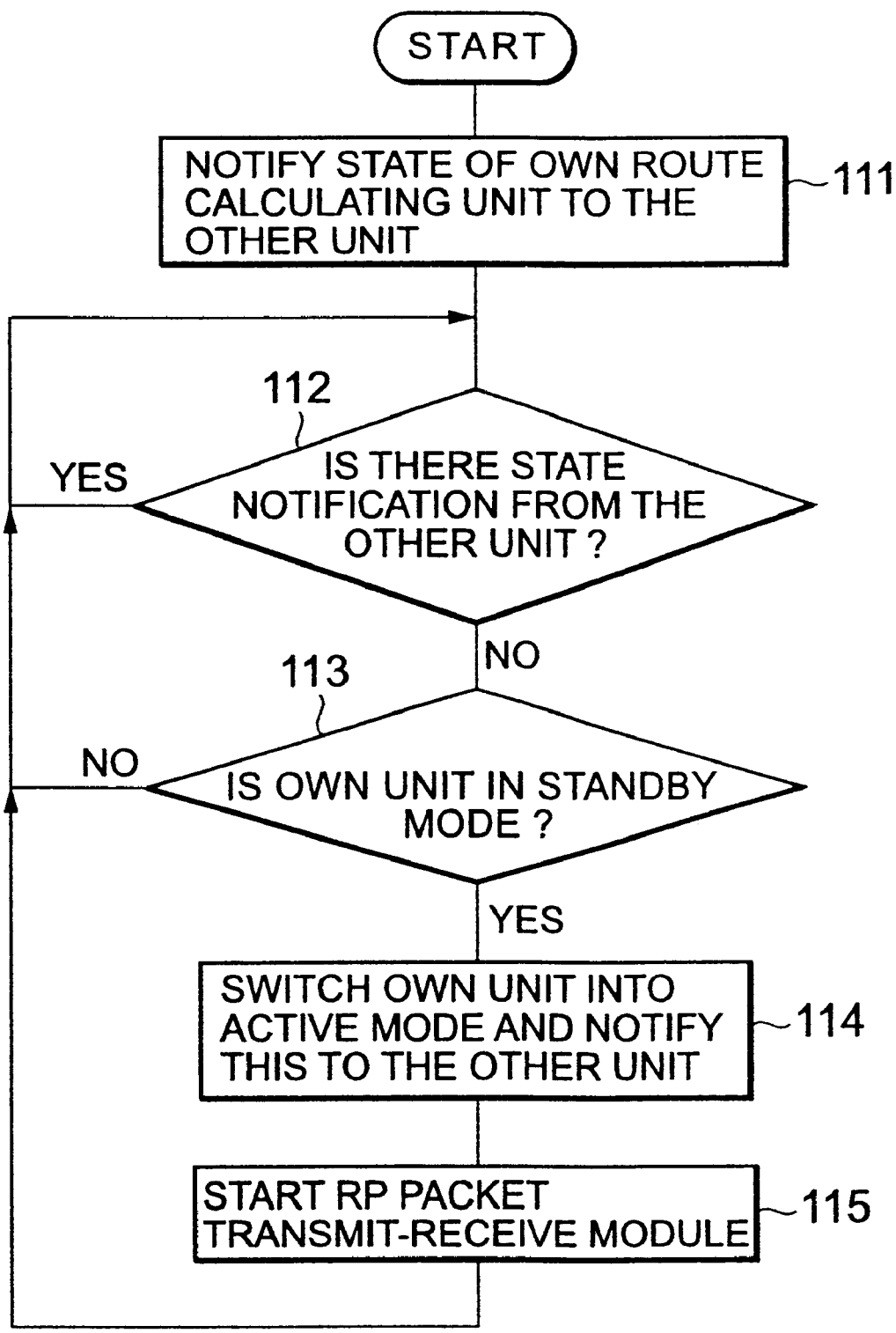
FIG. 7 is a flowchart showing the process executed by the state monitor module when the router is in operation in the first embodiment of the present invention.

FIG. 7 shows the process to be executed after the process shown in FIG. 6.

In this process, the state monitor module 20 gives an active mode notification to the other route calculation unit 11 periodically (step 111). The state monitor module 20 checks if there is any state notification from the other route calculation unit 11 (step 112). If there is no state notification for a fixed period, the state monitor module 20 perceives that a failure has occurred in the other route calculation unit 11. If the route calculation unit 11, which was perceived to have a failure, is in the active mode and its own route calculation unit 11 is in the standby mode (step 113), the state monitor module 20 brings its own route calculation unit into the active mode (step 114), starts the RP packet transmission-reception module 14 (step 115), and continues to execute the monitoring process.

Figure 8:
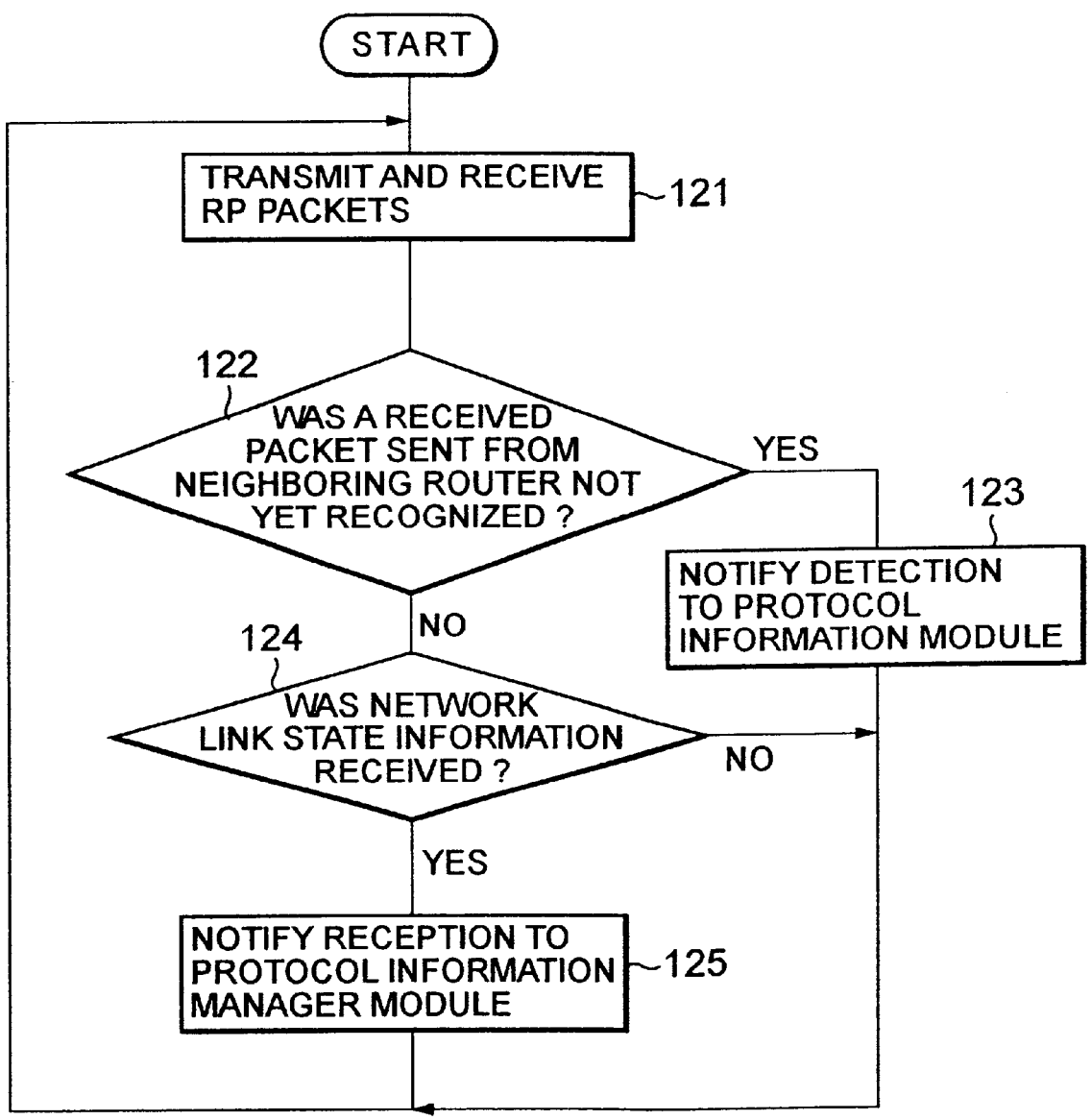
FIG. 8 is a flowchart showing the process executed by the RP packet transmission-reception module in the first embodiment of the present invention.

FIG. 8 shows the procedure of the process steps of the RP packet transmission-reception module 14 in the route calculation unit 11 in the active mode.

The RP packet transmission-reception module 14, when it is started, transmits routing protocol packets, such as Hello packets, onto the networks directly connected to the multiplex router 10, and receives routing protocol packets from other routers (step 121). If a received packet has come from a neighboring router, the module 14 checks whether the presence of which has been or has not been recognized (step 122). If the presence of which has not been recognized, the module 14 notifies the protocol information manager module 15 of the newly-detected neighboring router (step 123). If the presence of which has been recognized (step 124), the module 14 sends this network link-state information to the protocol information manager module 15 (step 125).

Figure 9:
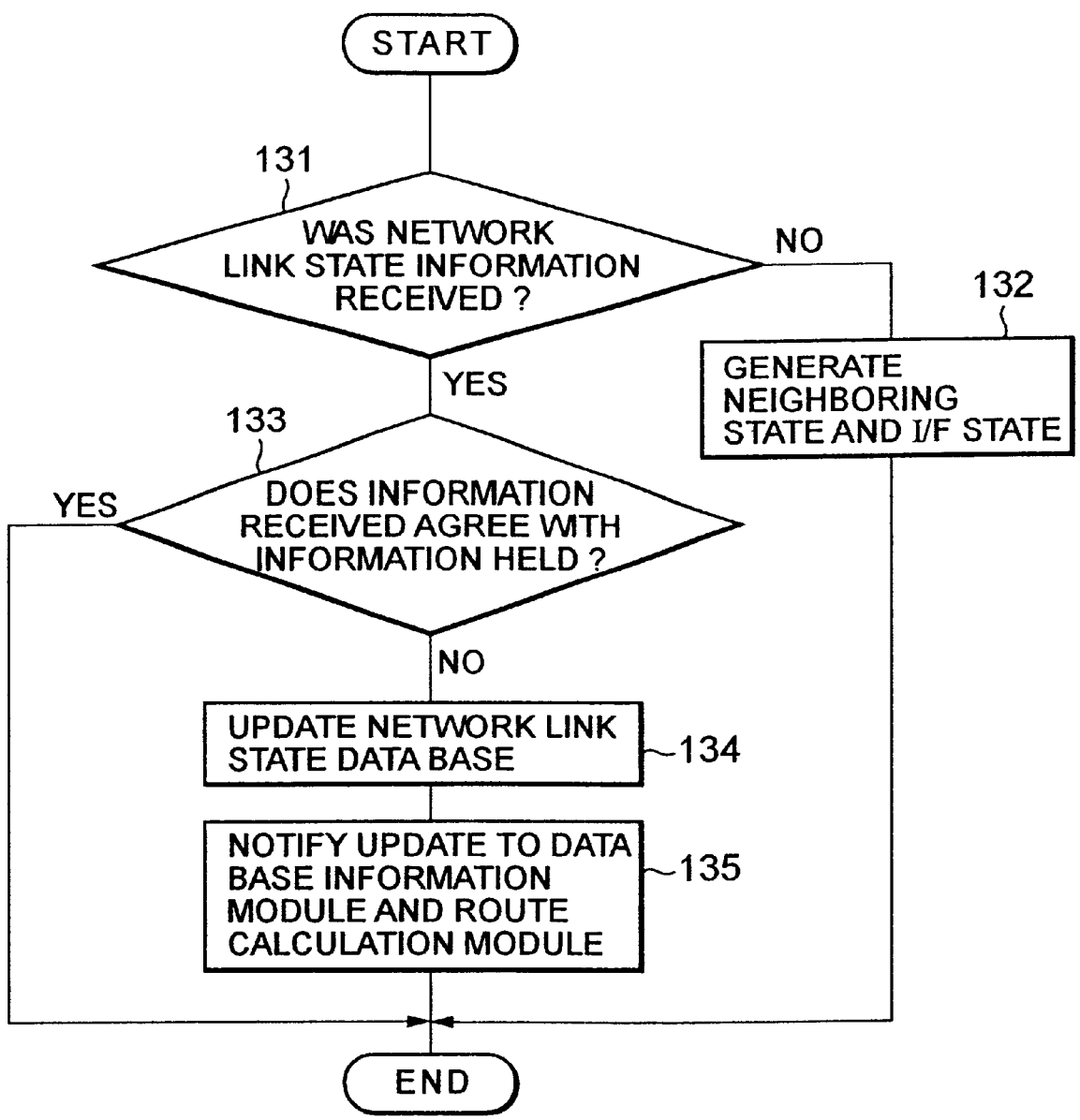
FIG. 9 is a flowchart showing the process executed by the protocol information manager module in the first embodiment of the present invention.

FIG. 9 shows the procedure of the process steps of the protocol information manager module 15 in the route calculation unit 11 in the active mode.

In this process, the protocol information manager module 15 receives information from the RP packet transmission-reception module 14, and checks if information received is network link-state information (step 131). If the information is not network link-state information, in other words, if the information is about a neighboring router, the module 15 generates neighboring router state 24 and interface state 23 from information received (step 132). On the other hand, if the information is network link-state information, the module 15 checks if the information received agrees with the contents of the link-state data base 22 (step 133).

If agreement is confirmed, it is not necessary to update the link-state data base 22. If they disagree, in other words, if it is necessary to update or delete existing information or add new information, the module 14 updates the link-state data base 22 (step 134). Then, the module 14 sends notification that the network link-state data base 22 has been updated and the contents of update to the data base integration module 17 and the routing table calculation module 16 (step 135).

The process steps executed by the data base integration module 17 will be described with reference to FIGS. 10 and 11.

Figure 10:
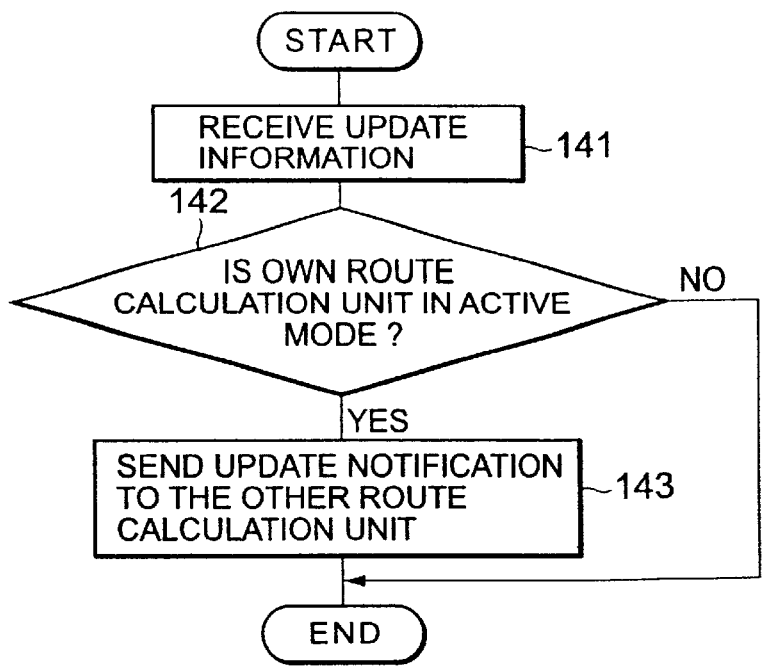
FIG. 10 is a flowchart showing the process executed by the data base integration module in the route calculation unit in active mode in the first embodiment of the present invention.

FIG. 10 shows the procedure of the process steps by data base integration module 17 on receiving notification of update of the link-state data base 22.

In this process, when the data base integration module 17 receives update information (step 141), if its own route calculation unit is in the active mode (step 142), the data base integration module 17 sends notification that the link-state data base 22 has been updated and the contents of update to the other route calculation unit 11, and closes the process.

Figure 11:
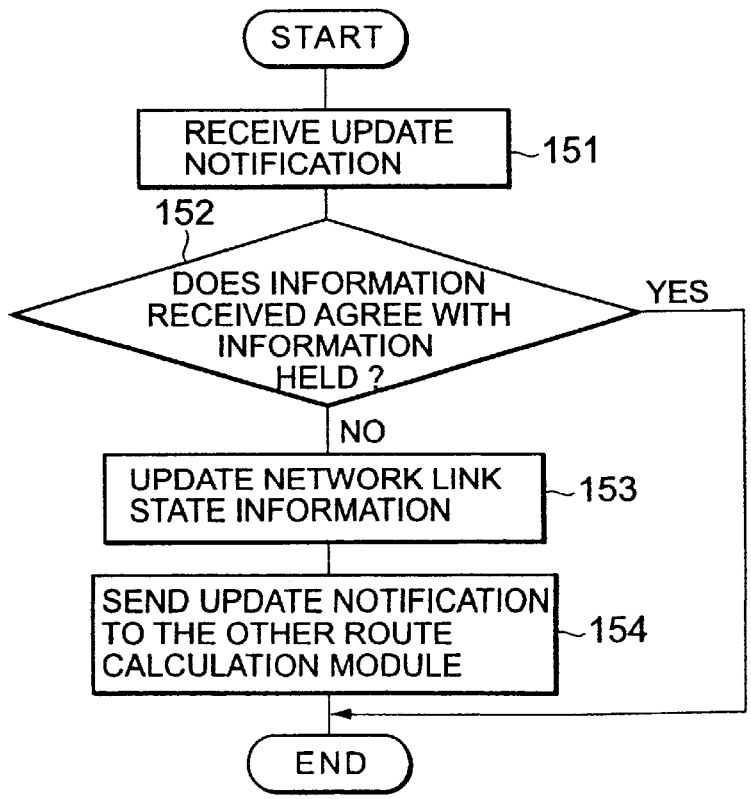
FIG. 11 is a flowchart showing the process executed by the data base integration unit of the calculation unit in a standby mode in the first embodiment of the present invention.

FIG. 11 shows the procedure of the process steps by the data base integration module 17 in the route calculation unit 11 in the standby mode when the module 17 receives notification of update of network link-state information from the route calculation unit 11 in the active mode.

In this process, the data base integration module 17 receives notification of update and obtains update information (step 151). The module 17 checks if update information agrees with the contents of the link-state data base 22 retained (step 152). If agreement is confirmed, it is not necessary to update the link-state data base 22, and therefore the process is terminated. If they disagree, in other words, if existing information is updated or deleted or new information is added, the module 17 updates the link-state data base 22 (step 153). The module 17 then sends update notification that the link-state data base 22 has been updated and the contents of update to the routing table calculation module 16-(step 154), and closes the process.

Figure 12:
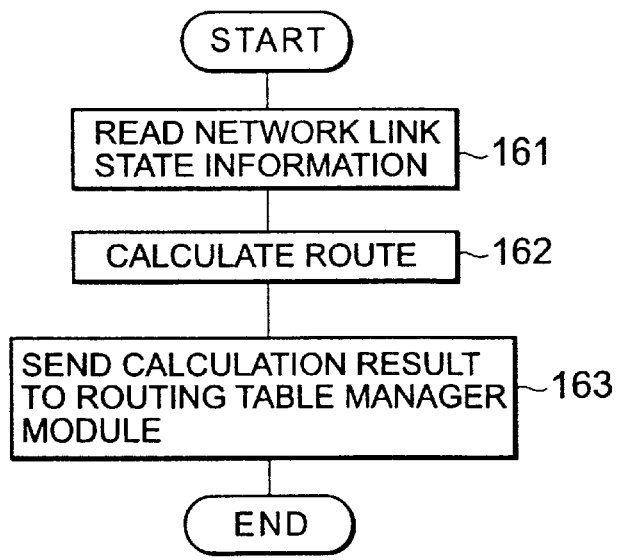
FIG. 12 is a flowchart showing the process executed by the routing table calculation module in the first embodiment of the present invention.

FIG. 12 shows the procedure of the process steps by the routing table calculation module 16 on receiving notification of update of the link-state data base 22.

In this process, the routing table calculation module 16 reads information about the updated link-state data base 22 (step 161), calculates routes by the earlier-mentioned SPF algorithm (step 162), and sends calculation results to the routing table manager module 18 (step 163).

Figure 13:
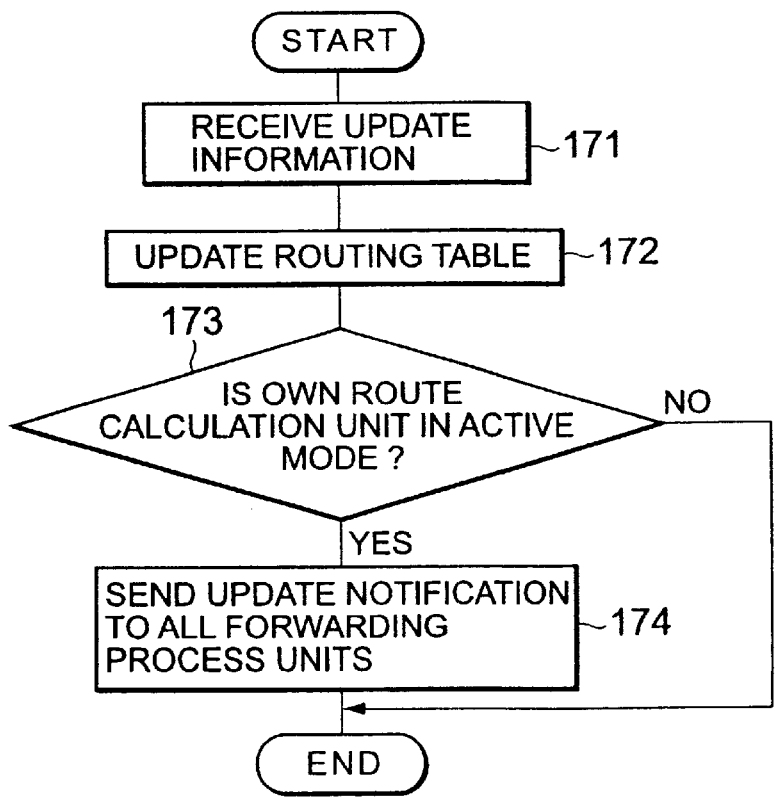
FIG. 13 is a flowchart showing the process executed by the routing table manager module in the first embodiment of the present invention.

FIG. 13 shows the procedure of the process steps by the routing table manager module 18 on receiving results of route calculation from the routing table calculation module 16.

In this process, the routing table manager module 18 obtains calculation results (step 171), and updates the routing table 19 (step 172). When its own route calculation unit is in the active mode (step 173), the module 18 sends notification that the routing table 19 has been updated and the contents of update to all forwarding process units existing in the multiplex router 10 (step 174) and closes the process. When the route calculation unit is in the standby mode, the module 18 updates the routing table and closes the process.

The forwarding process unit 13 rewrites the internal routing table 19 in accordance with the notified contents of update.

By the operations described above, even if there are a number of routers on the network to which a multiplex router is connected, at the time of a system switchover of the route calculating units in the multiplex router, it is possible to limit the traffic in the multiplex router and in the network.

Figure 14:
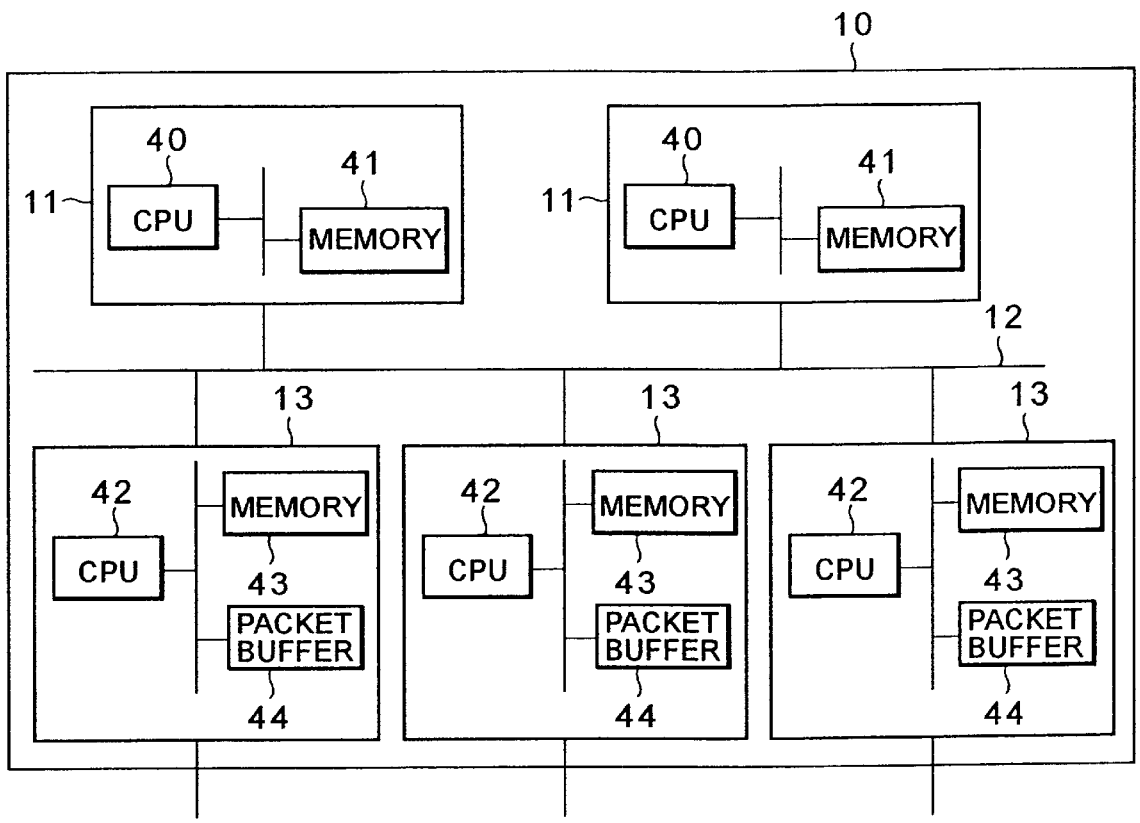
FIG. 14 is a block diagram showing an example of the hardware configuration of the multiplex router according to the present invention.

Meanwhile, the multiplex router 10 in FIG. 2 can be put into practice by applying a hardware configuration shown in FIG. 14, for example.

As shown in FIG. 14, in this configuration, the route calculation units 11 and the forwarding process units 13 are interconnected by the internal bus 12 of the multiplex router.

Each route calculation unit 11 includes a route calculation processor 40 and a memory 41. The route calculation processor 40 transmits and receives routing protocol packets to and from the routers 30 connected to the multiplex router 10. The route calculation processor 40 also manages routing protocol information, and calculates and distributes routing tables. All of the RP packet transmission-reception module 14, the protocol information manager module 15, the data base integration module 17, the routing table calculation module 16, the routing table manager module 18, and the state monitor module 20 can be collectively realized as processes in the route calculation processor 40. The memory 41 stores the routing protocol information 21 (link-state data base 22, interface state 23, and neighboring router state 24) and the routing table 19.

The forwarding process unit 13 includes a forwarding processor 42, a memory 43 and a packet buffer 44. The forwarding processor 42 makes a decision about whether or not to forward packets between the communication terminals 31 and decides transit nodes. The memory 43 stores a routing table 19 distributed by the route calculation units 11, required for packet forwarding. The packet buffer 44 temporarily stores packets received by the multiplex router 10. Packets judged forwardable according to the routing table are forwarded to the packet buffer in the forwarding process unit 13 at transit nodes, and transmitted. The packets judged not forwardable are deleted from the packet buffer 44.

The first embodiment of the present invention has been described.

Description will now move on to a second embodiment of the present invention.

Figure 15:
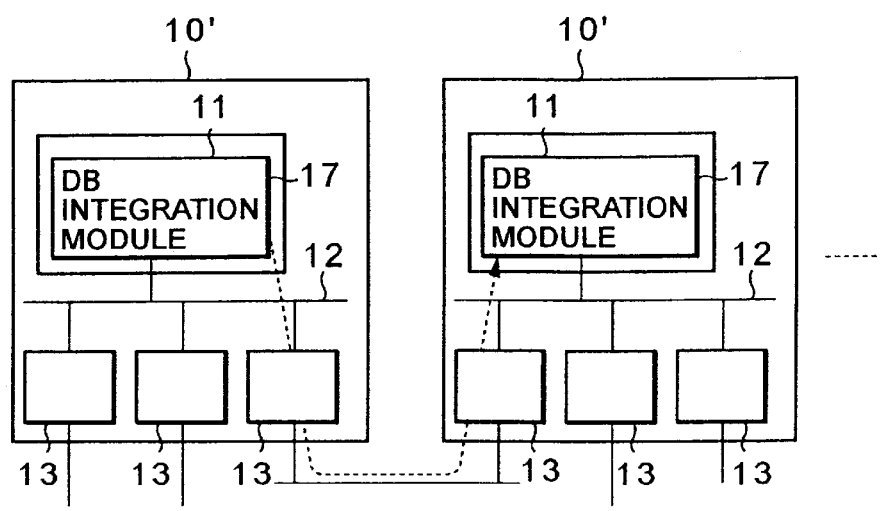
FIG. 15 is a block diagram showing the configuration of the multiplex router according to a second embodiment of the present invention.

FIG. 15 shows a configuration of the multiplex router according to a second embodiment of the present invention.

According to the second embodiment, a multiplex router is formed by connecting a plurality of routers 10' each not including multiple route calculation units 11. The plurality of routers 10' are connected through forwarding process units 13 and networks or other transmission paths.

In the second embodiment, out of a plurality of routers 10' connected, one router 10' is placed in the active mode and this router 10' obtains routing protocol information, while other routers are placed in the standby mode.

The route calculation unit 11 of each router 10' monitors the other router 10' through the forwarding process unit 13 of its own router 10'. The router 10' in the active mode holds routing protocol information 21, and when the link-state data base 22 has been updated, the data base integration module 17 executes the process shown in FIG. 10, and the data base integration module 17 sends update information to the router 10' in the standby mode through the forwarding process unit 13. In the router 10' in the standby mode, when it receives update information from the router 10' in the active mode, the data base integration module 17 executes the process in FIG. 11, and registers the update information in the link-state data base 22 in its own router.

If a failure or the like has occurred in the router 10' in the active mode, the whole of the router 10' shifts to the standby mode, a router 10' is switched to the active mode, and the route calculation unit 11 of the router 10' switched to the active mode sends a routing table to the forwarding process units connected to it, and causes the packet to be forwarded. Alternatively, it is possible to make such an arrangement that the routing table of the forwarding unit 13 in the router 10' switched to the standby mode should be rewritten each time the link-state data base is updated and that the forwarding process unit 13 of the router 10' switched to the standby mode should forward the packet.

Incidentally, if there are a plurality of routers, priority is established as to which router is the first to enter the active mode using configuration definition information. When a router is going to be started, if there is not any other router which notifies that it is in the standby mode, the router brings itself into the active mode. If there is a router that notifies that it is in the active mode, the router which received the notification goes into the standby mode. If there is no router which notifies that it is operating and if there are a plurality of routers which notify that they are in the standby mode, a router that goes into the active mode is determined by a value set by configuration definition information. If a router goes into the active mode, the router starts its own RP packet transmission-reception module 14.

If a route calculation unit 11 has a network interface, the route calculation unit 11 makes a direct connection to the network without the intervention of a forwarding process unit, and in this case, the router monitors the other router through a network to which the route calculation unit 11 is directly connected. Update of the link-state data base 22 is notified to the other router by direct communication between the route calculation units 11 without the intervention of the forwarding process units 13.

With the second embodiment, the same effects can be obtained as in the first embodiment.

As has been described, according to the present invention, using the router device including at least route calculation units in a multiplex configuration, it is possible to prevent an interruption of packet forwarding and an increase of traffic on the network at the time of system switchover, while reducing the amount of information transmitted from the route calculation unit in the active mode to the route calculation unit in the standby mode.

What is claimed is:

1. A router back-up method in a system where a plurality of routers are mutually connected via a network, comprising:

passing a routing protocol process from a router in an active mode to a router in a standby mode when a failure occurs in said router in said active mode, wherein said router in said active mode and said router in said standby mode are each provided with the same router identification (ID) in advance, wherein each router comprises:

a route calculation unit which performs a routing protocol process to create a routing table for deciding a packet route, and sends a packet in the network according to said routing table, wherein said route calculation unit of said router in said active mode performs said routing protocol process, holds routing protocol information including network link-state information containing identifying information of the router, neighboring router state information, and interface state information of said network to which said router is connected, and sends said network link-state information containing said identifying information of the router to said route calculation unit of said router in said standby mode, wherein said route calculation unit of said router in said standby mode receives and holds said network link-state information containing said identifying information of the router sent from said router in said active mode, monitors said router in said active mode, and when said router in said standby mode is shifted from said standby mode to said active mode due to a failure that occurred in said router in said active mode, said router shifted from said standby mode to said active mode takes over said routing protocol process as a router specified by said identifying information of the router in which the failure has occurred and which sent said network link-state information containing said identifying information, wherein said router shifted from said standby mode to said active mode performs said routing protocol process according to said network link-state information containing said identifying information of the router held in said router shifted from said standby mode to said active mode.

2. A router back-up method in a system where a plurality of routers are mutually connected via a network, comprising:

passing a routing protocol process from a router in an active mode to a router in a standby mode when a failure occurs in said router in said active mode, wherein said router in said active mode and said router in said standby mode are each provided with the same router identification (ID) in advance, wherein each router comprises:

a route calculation unit which performs a routing protocol process to create a routing table for deciding a packet route and sends a packet in said network according to said routing table, wherein said route calculation unit of said router in said active mode performs said routing protocol process, holds routing protocol information including network link-state information containing identifying information of the router, neighboring router state information, and interface state information of said network to which said router is connected, and sends said network link-state information containing identifying information of the router to said route calculation unit of said router in said standby mode to permit said router in said standby mode to monitor said router in said active mode and when said router in said standby mode is shifted from said standby mode to said active mode due to a failure that occurred in said router in said active mode, said router shifted from said standby mode to said active mode takes over said routing protocol process as a router specified by said identifying information.

3. A router back-up method in a system where a plurality of routers are mutually connected via a network comprising:

passing a routing protocol process from a router in an active mode to a router in a standby mode when a failure occurs in said router in said active mode, wherein said router in said active mode and said router in said standby mode are each provided with the same router identification (ID) in advance, wherein each router comprises:

a route calculation unit which performs a routing protocol process to create a routing table for deciding a packet route and sends a packet in said network according to said routing table, wherein said router calculation unit of said router in said standby mode receives and holds network link-state information containing identifying information of the router sent from said router in said active mode, monitors said router in said active mode, and when said router in said standby mode is shifted from said standby mode to said active mode due to a failure that occurred in said router in said active mode, said router shifted from said standby mode to said active mode takes over the routing protocol process as a router specified by said identifying information of the router in which the failure has occurred and which sent said network link-state information containing said identifying information, wherein said router shifted from said standby mode to said active mode performs said routing protocol process according to said network link-state information containing said identifying information of the router held in said router shifted from said standby mode to said active mode.

4. The router back-up method according to claim 1, wherein said routing protocol process includes collecting routing protocol information.

5. A network system where a plurality of routers are mutually connected via a network, each router comprising:
   a route calculation unit which performs a routing protocol process to create a routing table for deciding a packet route and sends a packet in said network according to said routing table, wherein said router includes a router in an active mode and a router in a standby mode,
   wherein said router in said active mode and said router in said standby mode are each provided with the same router identification (ID) in advance,
   wherein said route calculation unit comprises:
      holding means for holding network link-state information;
      wherein said router in said active mode comprises:
         sending means for sending said network link-state information containing identifying information of the router to said route calculation unit of said router in said standby mode, when a failure occurs in said router in the active mode; and
      wherein said router in said standby mode comprises:
         receiving means for receiving said network link-state information containing said identifying information of the router forwarded from said router in said active mode,
         storing means for storing said network link-state information containing identifying information of the router in said holding means, and
         monitoring means for monitoring said router in said active mode and when said router in said standby mode is shifted from said standby mode to said active mode due to a failure that occurred in said router in said active mode, said router shifted from said standby mode to said active mode takes over a routing protocol process as a router specified by said identifying information of the router in which the failure has occurred and which sent said network link-state information,
         wherein said router shifted from said standby mode to said active mode performs said routing protocol process according to said network link-state information containing said identifying information of the router held in said router shifted from said standby mode to said active mode.

6. A router used in a network system where plurality of routers are mutually connected via a network, each router comprising:
   a route calculation unit which performs a routing protocol process to create a routing table for deciding a packet route, and sends a packet in said network according to said routing table,
   wherein said router is in either of an active mode and a standby mode,
   wherein when said router is in said active mode, said router is provided in advance with the same router ID as another router which is in said standby mode and which serves as a standby router to said router,
   wherein when said router is in said standby mode, said router is provided in advance with the same router ID as another router which is in said active mode to which said router serves as a standby router, and
   wherein said route calculation unit comprises:
      holding means for holding network link-state information containing identifying information of the router, and
      sending means for sending said network link-state information containing identifying information of the router to one of the other routers in said standby mode, when said router is in said active mode and a failure occurs to permit said router in said standby mode to monitor said router in said active mode and when said router in said standby mode is shifted from said standby mode to said active mode due to a failure that occurred in said router in said active mode, said router shifted from said standby mode to said active mode takes over said routing protocol process a router specified by said identifying information.

7. A router used in a network system where a plurality of routers are mutually connected via a network, each router comprising:
   a route calculation unit which performs a routing protocol process to create a routing table for deciding a packet route, and sends a packet in the network according to said routing table,
   wherein said router comprises a router in an active mode and a router in a standby mode,
   wherein said router in said active mode and said router in said standby mode are each provided with the same router identification (ID) in advance,
   holding means for holding network link-state information containing identifying information of the router;
   means for receiving said network link-state information containing identifying information of the router sent from said router in said active mode; and
   monitoring means for monitoring said router in said active mode and when said router in said standby mode is shifted from said standby mode to said active mode due to a failure that occurred in said router in said active mode, said router shifted from said standby mode to said active mode takes over a routing protocol process as a router specified by said identifying information of the router in which the failure has occurred and which sent said network link-state information containing said identifying information,
   wherein said router shifted from said standby mode to said active mode performs said routing protocol process according to said network link-state information containing said identifying information of the router held in said router shifted from said standby mode to said active mode.

* * * * *